United States Patent [19]

Nail

[11] 3,915,875

[45] Oct. 28, 1975

[54] LOW TEMPERATURE FLUID

[75] Inventor: Donald H. Nail, Los Angeles, Calif.

[73] Assignee: McDonnell Douglas Corporation, Long Beach, Calif.

[22] Filed: Mar. 23, 1973

[21] Appl. No.: 344,143

[52] U.S. Cl. .................... 252/67; 252/69; 252/78
[51] Int. Cl.$^2$ .................... C09K 5/00; C10M 5/00
[58] Field of Search ..................... 252/67, 78, 69

[56] References Cited
UNITED STATES PATENTS

| 2,035,541 | 3/1936 | Fleischer | 252/69 |
| 2,550,196 | 4/1951 | Jones | 252/67 |
| 2,590,542 | 3/1952 | Jones | 252/67 |
| 2,999,815 | 9/1961 | Eisenman | 252/67 |
| 2,999,816 | 9/1961 | Bennett et al. | 252/67 |
| 2,999,817 | 9/1961 | Bower | 252/67 |

*Primary Examiner*—Benjamin R. Padgett
*Assistant Examiner*—Josephine Lloyd
*Attorney, Agent, or Firm*—Max Geldin

[57] ABSTRACT

Low temperature heat transfer or functional fluid in the form of 1,1,2-trichloro-1,2,2-trifluoroethane, saturated with carbon dioxide, with or without the presence of solid carbon dioxide. The resulting fluid is a clear, low viscosity liquid at temperature down to −110°F and below, at ambient pressure, substantially below the freezing point of the above trichlorotrifluoroethane.

14 Claims, No Drawings

LOW TEMPERATURE FLUID

This invention relates to a low temperature fluid, and is particularly concerned with the provision of a refrigerant or low temperature heat transfer fluid or functional fluid comprising as the essential component, 1,1,2-trichloro-1,2,2-trifluoroethane, also referred to herein as trichlorotrifluoroethane, and marketed as Freon TF or Freon (113) by DuPont.

Various low temperature or solvent fluids have been developed containing mixtures of chlorinated fluorocarbons, particularly the Freons, such as trichlorotrifluoroethane, and other materials, and also mixtures of carbon dioxide with low temperature or cryogenic fluids. Thus, for example, U.S. Pat. No. 2,999,817 discloses an azeotropic mixture of 1,1,2-trichloro-1,2,2-trichloroethane and methylene chloride.

The compound 1,1,2-trichloro-1,2,2-trifluoroethane has also been disclosed as forming azeotropic mixtures with acetone (U.S. Pat. No. 2,999,815) and with methyl alcohol (U.S. Pat. No. 2,999,816). Mixtures of 1,1,2-trichloro-1,2,2-trifluoroethane with perfluorodimethylcyclobutane are disclosed in U.S. Pat. No. 3,578,597.

Carbon dioxide in the form of "dry ice" is also a well-known refrigerant. This material has also been employed in combination with other materials and cryogenic fluids. Thus, U.S. Pat. No. 3,393,152 discloses a cryogenic liquid having a boiling temperature below about −300°F at atmospheric pressure, in the form of liquid nitrogen containing finely divided solid carbon dioxide suspended in such liquid. As pointed out in the patent, cryogenic liquids having boiling temperatures substantially warmer than −300°F have been found unsuitable because in such liquids the carbon dioxide particles tend to adhere to one another and form a solidified mass of solid carbon dioxide.

U.S. Pat. Nos. 2,550,196 and 2,590,542 disclose a composition comprising a block of solid carbon dioxide and frozen particles of a water solution of ethanol or methanol distributed throughout the block or cake of solid carbon dioxide. U.S. Pat. No. 2,290,532 discloses carbon dioxide dissolved in an amino-alcohol, as a refrigerant.

Neat or pure 1,1,2-trichloro-1,2,2-trifluoroethane freezes at −31°F (−35°C) and hence, as such, cannot be employed as a refrigerant or functional fluid, and particularly as a low temperature heat transfer fluid, which is operable at temperatures below about −30°F, that is, at temperatures ranging from about −30°F down to about −120°F, and lower. There are many applications, e.g. aircraft operations, where a heat transfer fluid or coolant is required which is operative and remains liquid at temperatures ranging from about 0°F down to about −120°F, and lower.

It has been unexpectedly found, according to the present invention, that although 1,1,2-trichloro-1,2,2-trifluoroethane freezes at the above noted temperature of −31°F, 1,1,2-trichloro-1,2,2-trifluoroethane saturated with carbon dioxide is a clear, low viscosity liquid at temperatures as low as about −108°F to about −112°F, and at even lower temperature, at ambient pressure. Such trichlorotrifluoroethane fluid saturated with carbon dioxide as noted above, has such advantageous low temperature properties, with or without the presence of excess solid carbon dioxide (i.e. dry ice).

It has been found from experience that a true depression of the freezing point of the trichlorotrifluoroethane occurs when this fluid in liquid form contains or is saturated with carbon dioxide at the temperature of use, rather than a super-cooling of the liquid. Thus, for example, the above trichlorotrifluoroethane has been frozen solid, and solid carbon dioxide (dry ice) placed on top of the trichlorotrifluoroethane. Within a few minutes the trichlorotrifluoroethane, though still well below its melting point, melts and a mixture of liquid 1,1,2-trichloro-1,2,2-trifluoroethane saturated with carbon dioxide and containing suspended particles or chunks of solid dry ice, results.

The freezing point of liquid 1,1,2-trichloro-1,2,2-trifluoroethane saturated with carbon dioxide gas has been found to be approximately −122°F. The viscosity of such trichlorotrifluoroethane saturated with $CO_2$, e.g. at −112°F, is substantially less than the viscosity of water at room temperature.

If the trichlorotrifluoroethane fluid saturated with carbon dioxide according to the invention is subjected to pressure, as by pressurizing with $CO_2$, a fluid is thus provided which is useful as a refrigerant, heat transfer fluid, or functional fluid at even lower temperatures than the above-noted approximately −122°F freezing point for such $CO_2$-saturated fluid at ambient pressure.

In producing the novel fluid or liquid blend of the invention, carbon dioxide gas or solid carbon dioxide is introduced into the 1,1,2-trichloro-1,2,2-trifluoroethane, preferably at least sufficient carbon dioxide either in gaseous or solid form being present to form a substantially saturated solution at the temperature of use. Thus, although pure 1,1,2-trichloro-1,2,2-trifluoroethane has a freezing temperature of −31°F (−35°C) and solid carbon dioxide sublimes at −109°F, 1,1,2-trichloro-1,2,2-trifluoroethane saturated with carbon dioxide at −110°F to −112°F, or below, and down to about −122°F, is a clear low viscosity liquid. Accordingly, such trichlorotrifluoroethane saturated with carbon dioxide, with or without the presence of excess carbon dioxide particles, remains liquid and is operative as a refrigerant, heat transfer medium, or functional fluid, over a highly desirable low temperature range of from about −30°F down to about −120°F, at ambient pressure, or lower if such fluid is under pressure. Further, since such fluid has a wide liquid range extending from low temperatures to elevated temperatures, the trichlorotrifluoroethane preferably saturated with $CO_2$ liquid according to the invention can be employed as a circulatory heat transfer medium, hydraulic fluid or as a lubricant, particularly in the −120°F to +87°F range, especially in aircraft and space applications.

This is in contrast to the very low temperature cryogenic liquid useful at temperature only below about −300°F disclosed in above-noted U.S. Pat. No. 3,393,152, and wherein it is necessary that solid carbon dioxide particles be suspended in the cryogenic liquid, for example, liquid nitrogen, and wherein it is noted that cryogenic liquids having boiling temperatures warmer than −300°F are inoperative in combination with the carbon dioxide particles because the latter tend to adhere and form a solid mass.

At ambient pressure, by maintaining excess solid carbon dioxide present in the solution, this will maintain the solution saturated with carbon dioxide and gas is evolved from the solution until such time as all of the solid carbon dioxide has been consumed, thus maintaining a useful liquid at a particular low temperature down to a temperature as low as −120°F, as for example, when the fluid is employed as a coolant or circulating heat transfer medium. Under pressure conditions in closed systems, the same or lower useful low temperature liquid range can be maintained as by suitably pressurizing the system with $CO_2$ to maintain a substantially saturated solution.

It has been found significantly that other related chlorinated hydrocarbons and chlorinated fluorocarbons when saturated with carbon dioxide fail to produce useful low temperature liquids. Thus, for example, the following liquids failed in this respect:
a. 1,1,1-trichlorotrifluoroethane
b. 1,1,2,2-tetrachloroethane
c. chloroform
d. 1,1,2,2-tetrachlorodifluoroethane
e. 1,1,1-trichloroethane.

It is noted among the related halogenated hydrocarbons listed above, that, for example, 1,1,1-trichloroethane has a freezing point of −33°C, which is close to the −35°C freezing point of 1,1,2-trichloro-1,2,2-trifluoroethane, yet the saturation of the former with carbon dioxide was ineffective in depressing the freezing point of this material, in contrast to the substantial suppression of the freezing point of 1,1,2-trichloro-1,2,2-trifluoroethane saturated with carbon dioxide, according to the invention.

An additional advantage of the present invention is that the trichlorotrifluoethane and $CO_2$ components of the invention liquid are non-flammable, and hence, there is no danger of reaction with condensed liquid air or oxygen at extremely low temperatures.

The following examples further illustrate the invention.

EXAMPLE 1

About 390 grams of 1,1,2-trichloro-1,2,2-trifluoroethane was slowly poured over about 285 grams of dry ice. There resulted a liquid consisting of 1,1,2-trichloro-1,2,2-trifluoroethane saturated with carbon dioxide and containing several pieces of dry ice. This liquid was prepared in a 2 liter dewar, and was then poured into a beaker and the total volume of the liquid was found to be about 350 ml, of which about 5 to 10% of the total was solid dry ice. The temperature of the liquid was then found to be about −110°F.

EXAMPLE 2

A container containing 66 grams of 1,1,2-trichloro-1,2,2-trifluoroethane was placed in a cooling bath consisting of liquid 1,1,2-trichloro-1,2,2-trifluoroethane saturated at ambient pressure with carbon dioxide and containing solid crushed dry ice. The trichlorotrifluoroethane in the container froze solid. About 12 grams of solid $CO_2$ was then placed in the container and the container with its contents was placed back in the 1,1,2-trichloro-1,2,2-trifluoroethane-dry ice bath.

At this point the container held solid 1,1,2-trichloro-1,2,2-trifluoroethane at the bottom and solid $CO_2$ powder at the top. After about 15 minutes, the container was withdrawn and the interface of the solid trichlorotrifluoroethane and solid dry ice was observed to be liquid. Bath temperature was −112°F.

After another 2 hours in the cold bath, the contents at the bottom of the container were still solid, as were the contents in the top thereof, and there was approximately 15 ml of liquid at the interface. The container was then withdrawn from the cold bath and thus was supplied heat from the ambient room temperature atmosphere. In a few minutes the entire container was in liquid form except for a few pieces of dry ice, and rapidly evolving $CO_2$ gas.

This example shows that no super cooling of the 1,1,2-trichloro-1,2,2-trifluoroethane occurs upon saturation thereof with carbon dioxide, but rather an actual melting point suppression of the trichlorotrifluoroethane.

EXAMPLE 3

Additional 1,1,2-trichloro-1,2,2-trifluoroethane was poured into the trichlorotrifluoroethane-dry ice bath used in Example 2 above. A few moments later, the temperature was found to be approximately −112°F.

The clear liquid phase was then decanted. Volume of such liquid was 300 ml and it was clear, thinner than water and at a temperature of about −112°F. The solution in the absence of solid carbon dioxide was evolving gas rapidly. Such gas evolution could be stopped either by pressurizing the liquid or by chilling thereof.

EXAMPLE 4

The procedure of Example 1 was repeated, and the trichlorotrifluoroethane solution saturated with $CO_2$ and containing particles of dry ice, and at ambient pressure, was then further cooled by immersion in a liquid nitrogen bath. The resulting solution was found to be maintained in liquid form down to about −120°F.

Although it has been found preferable to maintain the solution of 1,1,2-trichloro-1,2,2-trifluoroethane and $CO_2$ substantially saturated with respect to $CO_2$ in order to obtain a liquid blend having as low a liquid temperature range as possible, less than saturated solutions of $CO_2$ in the trichlorotrifluoroethane can be employed and still produce a liquid blend with a freezing point substantially lower than that of the pure trichlorotrifluoroethane. Thus, for example, liquid solutions of the trichlorotrifluoroethane having a concentration of $CO_2$ ranging from saturation thereof down to, for example, about 10% saturation, may produce a liquid blend having a freezing point substantially below −31°F. Where, for example, the solution is about 50% saturated with $CO_2$, the freezing point of such solution is below about −64°F.

From the foregoing, it is seen that the invention affords a simple, economical means for transforming 1,1,2-trichloro-1,2,2-trifluoroethane from a liquid which has a relatively high melting point of −31°F to a fluid which has a wide liquid range at relatively low temperature ranging from about −30°F to about −120°F at ambient pressure, and which accordingly is particularly useful as a refrigerant, heat transfer medium or functional fluid, particularly within such low temperature range at ambient pressure. Such trichlorotrifluoroethane solution containing saturated $CO_2$, thus has utility in aircraft and space application, particularly as a heat transfer fluid, as a functional or hudraulic fluid, and as a lubricant, and specifically including utility in low temperature circulating fluid systems such as used in environmental control systems for spacecraft and airborne electronic systems. The invention composition or fluid also has general utility as a refrigerant, e.g. in dry ice cold traps in laboratories in place of the conventional acetone, while being completely noninflammable, and as a thermometer fluid. The blend of trichlorotrifluoroethane preferably saturated with $CO_2$ of the invention can be maintained either by having additional solid $CO_2$ present in the solution, or by pressurization with $CO_2$.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A refrigerant, low temperature heat transfer fluid or functional fluid, consisting essentially of liquid 1,1,2-trichloro-1,2,2-trifluoroethane and carbon dioxide, said fluid having a concentration of $CO_2$ ranging from about saturation down to about 10% saturation.

2. A fluid as defined in claim 1, consisting essentially of 1,1,2-trichloro-1,2,2-trifluoroethane saturated with carbon dioxide.

3. A fluid as defined in claim 2, additionally containing solid carbon dioxide in said fluid.

4. A fluid as defined in claim 2, said fluid remaining in liquid form when saturated with carbon dioxide at temperature down to at least about −108°F to about −112°F and at ambient pressure.

5. A fluid as defined in claim 3, said fluid remaining in liquid form when saturated with carbon dioxide at temperature down to at least about −108°F to about −112°F at ambient pressure.

6. A fluid as defined in claim 2, said fluid having a freezing point of about −122°F and at ambient pressure.

7. A fluid as defined in claim 3, said fluid having a freezing point of about −122°F at ambient pressure.

8. A fluid as defined in claim 2, said fluid remaining in liquid form when saturated with carbon dioxide at temperature down to at least about −108°F to about −112°F and at ambient pressure, said fluid having a freezing point of about −122°F at ambient pressure.

9. A fluid as defined in claim 3, said fluid remaining in liquid form when saturated with carbon dioxide at temperature down to at least about −108°F to about −112°F and at ambient pressure, said liquid having a freezing point of about −122°F at ambient pressure.

10. A fluid as defined in claim 2, said fluid when pressurized having a freezing point below about −122°F.

11. A fluid as defined in claim 3, said fluid when pressurized having a freezing point below about −122°F.

12. A fluid as defined in claim 2, said fluid when pressurized with $CO_2$ having a freezing point below about −122°F.

13. A fluid as defined in claim 3, said fluid when pressurized with $CO_2$ having a freezing point below about −122°F.

14. A fluid as defined in claim 1, said fluid having a concentration of $CO_2$ ranging from about saturation down to about 50% saturation, said fluid having a freezing point ranging from about −122°F to less than about −64°F.

* * * * *